(12) United States Patent
Chen

(10) Patent No.: US 8,218,758 B2
(45) Date of Patent: Jul. 10, 2012

(54) SLIDING RAIL STRUCTURE OF A SLIDING CELL PHONE AND ITS METHODS

(75) Inventor: Wei Chen, Shenzhen (CN)

(73) Assignee: TCL Tian Yi Mobile Communications (Shenzhen) Company Limited, Nanshan District, Shenzhen, Guangdong (CN)

( * ) Notice: Subject to any disclaimer, the term of this patent is extended or adjusted under 35 U.S.C. 154(b) by 207 days.

(21) Appl. No.: 12/920,250

(22) PCT Filed: Apr. 13, 2009

(86) PCT No.: PCT/CN2009/071252
§ 371 (c)(1),
(2), (4) Date: Aug. 30, 2010

(87) PCT Pub. No.: WO2009/127146
PCT Pub. Date: Oct. 22, 2009

(65) Prior Publication Data
US 2011/0002562 A1  Jan. 6, 2011

(30) Foreign Application Priority Data

Apr. 15, 2008 (CN) .......................... 2008 1 0066642

(51) Int. Cl.
*H04M 1/00* (2006.01)
*H04M 9/00* (2006.01)
(52) U.S. Cl. ................................ 379/433.12; 455/575.4
(58) Field of Classification Search ............ 379/433.01, 379/433.11, 433.12; 455/575.1, 575.4; 16/327, 16/328
See application file for complete search history.

(56) References Cited

U.S. PATENT DOCUMENTS

2005/0054397 A1* 3/2005 Kim et al. .................. 455/575.4
2007/0243912 A1* 10/2007 Lee et al. ................... 455/575.4
2007/0270180 A1* 11/2007 Takagi ....................... 455/550.1
* cited by examiner

*Primary Examiner* — Tuan Nguyen
(74) *Attorney, Agent, or Firm* — Shimokaji & Associates, P.C.

(57) ABSTRACT

A sliding rail of a sliding closure mobile phone includes a sliding rail fixing part fixed on the body of the mobile phone, a sliding rail sliding strip, and a sliding rail moving part fixed connected on the sliding closure of the mobile phone. The sliding rail sliding strip is set between the sliding rail fixing part and the sliding rail moving part for noise cancelling and sliding. Several lug bosses are set at the coupling position of the sliding rail sliding strip and the sliding rail fixing part for adapting to and holding the sliding rail fixing part.

9 Claims, 4 Drawing Sheets

SLIDING RAIL STRUCTURE OF A SLIDING CELL PHONE AND ITS METHODS

TECHNICAL FIELD

The present invention relates to a slide cell phone device and methods. In particular, it relates to the improvement of a sliding rail structure that connects the main body and the slide and its method.

BACKGROUND TECHNOLOGY

In the existing technology, the use of cell phone devices has been more and more extensive and there are more and more styles of cell phones. Currently, major cell phone styles include the straight style, the upper flip style, the lower flip style and the slide style. With the slide cell phones, in addition to shrinking the volume, they can also make the exterior of the cell phone more fashionable while increasing the fun of using it.

Slide cell phones generally place cell phone displays, etc., on the slide. The keys of the cell phone are placed on the main body and the main body and the slide are connected by the sliding rails on the two sides. As shown in FIG. 1 and FIG. 2, to ensure the lifecycle and reliability for an ordinary cell phone, its sliding rails are made of metal parts plus plastic strips and include a sliding rail fastener 110 and a sliding rail moving part 120. Between the sliding rail fastener 110 and the sliding rail moving part 120, there is a sliding rail slider 130. On the aforementioned sliding rail fastener 110 and the aforementioned sliding rail moving part 120, a plurality of threaded holes 140 are correspondingly placed and used to be respectively fastened and connected to the slide and the cell phone main body.

In the sliding rail structure in the existing technology, the principles of sliding is shown in FIG. 1. Generally, the sliding rail fastener 110 is fastened to the main body. The sliding rail moving part 120 is fastened to the bottom enclosure of the slide. Thus, the cell phone's slide is driven by the sliding rail moving part to slide it up and down.

Generally, an ordinary sliding rail structure in the existing technology is shown in FIG. 2, wherein the screw hole has not been processed at all. Only a screw thread is tapped on an iron sheet with a thickness of 0.5 mm. It has a short effective distance. During long time use, it is extremely easy for the screw to become detached due to frequent sliding and vibrations.

Also, the slider, which is placed between the sliding rail fastener and the sliding rail moving part, is generally made of a plastic material and is mainly used to muffle noise and facilitate sliding. The impact ductility of the plastic material is limited. If it falls, the two ends of the sliding rail slider 130 will be subject to a great impact, and the two ends are highly likely to break, thus causing structural damage.

One must be very careful when using a slide cell phone with such a structure and handle it gently. In particular, one must take care not to drop it from any height. Otherwise, it is quite easy to cause the cell phone to break and not to slide smoothly, thus causing great inconvenience to the user.

Therefore, the above sliding rail structure needs to be improved.

SUMMARY OF THE INVENTION

The purpose of the present invention is to provide a sliding rail structure of a sliding cell phone and its a method for use, whereby through improving the structure of the sliding rail slider placed between sliding rail fastener and the sliding rail moving part, the stress capability of the sliding rail is improved, thus effectively controlling the possibility of unsmooth sliding of the cell phone slide.

The technical solution of the present invention is as follows:

A sliding rail structure of a sliding cell phone, comprising a sliding rail fastener fastened to the cell phone main body, a sliding rail slider and a sliding rail moving part that fastens and connects to the cell phone slide. The aforementioned sliding rail slider is placed between the aforementioned sliding rail fastener and the aforementioned sliding rail moving part and is used to muffle nose and facilitate sliding; it is characterized in that a plurality of protruding platforms are placed at the location that fastens the aforementioned sliding rail slider and the aforementioned sliding rail fastener, for use in fitting and holding the aforementioned sliding rail fastener on top.

The aforementioned sliding rail structure, wherein three of the aforementioned protruding platforms are placed.

The aforementioned sliding rail structure, wherein on the aforementioned sliding rail fastener, a plurality of first threaded holes are placed at locations for use in connecting to the aforementioned cell phone main body. The aforementioned first threaded holes are placed within a protrusion.

The aforementioned sliding rail structure, wherein on the aforementioned sliding rail moving part, a plurality of second threaded holes are placed at locations for connection to the aforementioned cell phone slide. The aforementioned second threaded holes are placed within a protrusion.

A method for making the sliding rail of a slide cell phone, which comprises the following steps:

A. On the aforementioned sliding rail fastener, at a location that fastens to the aforementioned sliding rail slider, two holes are drilled, so as to partially expose the sliding rail slider;

B. The periphery of the aforementioned holes is flanged, so that three protruding platforms are formed on the sliding rail slider.

The aforementioned method, which also comprises the following steps:

C. On the aforementioned sliding rail fastener, at locations that connect to the aforementioned cell phone main body, a plurality of first holes are drilled, so as to cause their peripheries to protrude; and D. A thread is tapped inside the aforementioned first holes to form the first threaded holes;

The aforementioned method, which also comprises the following steps:

E. On the aforementioned sliding rail moving part, at locations that connect to the aforementioned cell phone slide, a plurality of second holes are drilled, so as to cause their peripheries to protrude; and F. A thread is tapped inside the aforementioned second holes to form the second threaded holes.

The aforementioned method, wherein in the aforementioned step A, the aforementioned holes are placed near the two ends of the sliding rail fastener.

The aforementioned method, wherein in the aforementioned step A, the aforementioned holes are U shaped holes.

A sliding rail structure of a sliding cell phone and its method provided by the present invention, wherein, in the sliding rail structure, a plurality of protruding platforms are placed on the sliding rail slider to improve the stress capability of the sliding rail, thus effectively controlling the possibility of cracking on the plastic heads on the two ends of the slider and thus causing unsmooth sliding. Therefore, the product yield and lifecycle is improved.

CAPTIONS FOR THE DIAGRAMS

SPECIFIC EMBODIMENT

The following is a further and more detailed description of the preferred embodiments of the present invention in light of the diagrams.

Figure 1:
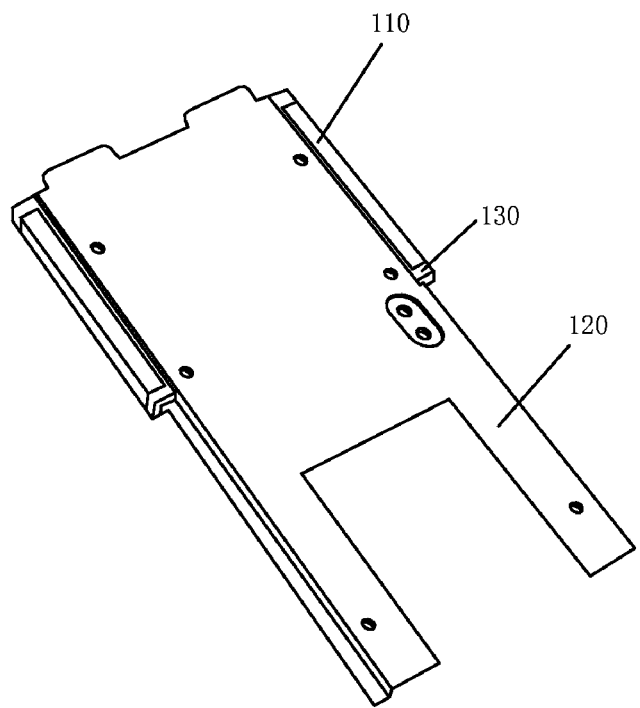
FIG. 1 is a diagram of a sliding rail structure of a sliding cell phone in the existing technology and its principles for sliding.
Figure 2:
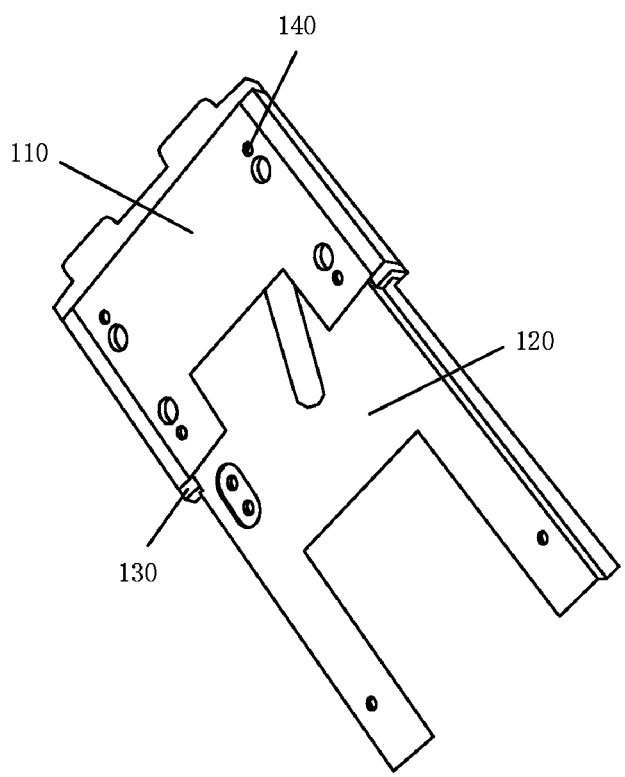
FIG. 2 is a diagram of an ordinary sliding rail structure of a sliding cell phone in the existing technology.
Figure 3:
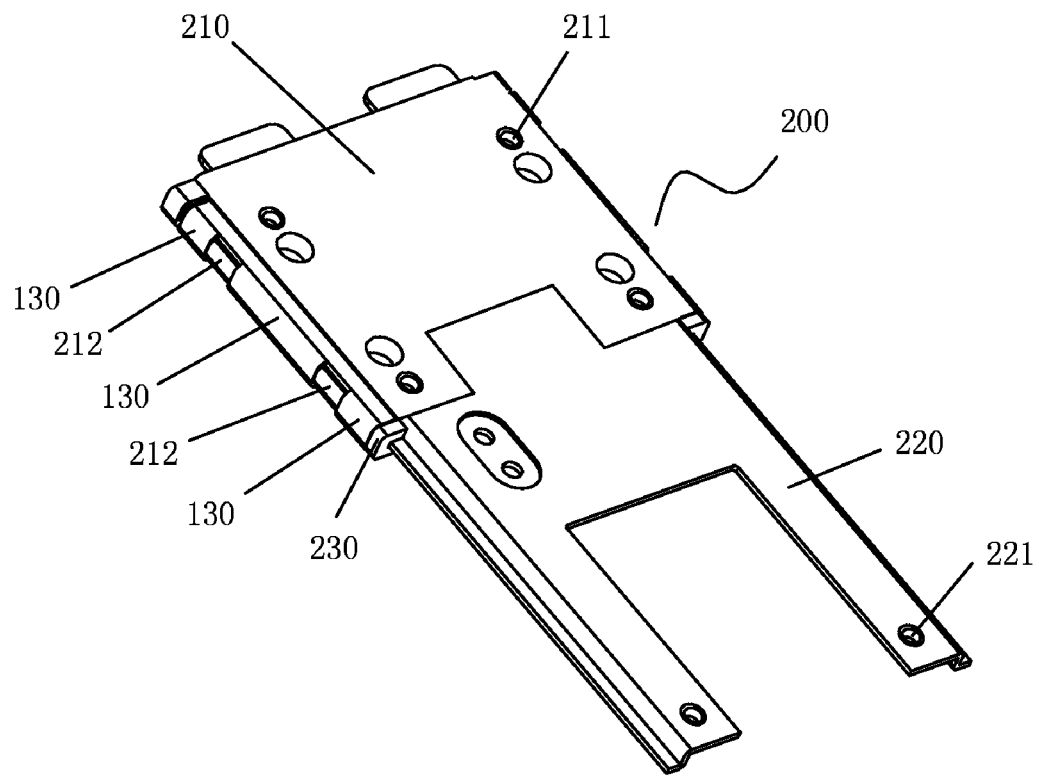
FIG. 3 is a diagram of the sliding rail structure in the present invention.

The sliding rail structure of a slide cell phone in the present invention, as shown in FIG. 3, comprises a sliding rail fastener 210 fastened to the cell phone main body 100, a sliding rail slider 230 and a sliding rail moving part 220 that fastens and connects to the cell phone slide 300. The aforementioned sliding rail slider 230 is placed between the aforementioned sliding rail fastener 210 and the aforementioned sliding rail moving part 220, and is used to muffle nose and facilitate sliding.

As shown in FIG. 3, the aforementioned sliding rail fastener 210 in the present invention is placed in a way that through the aforementioned sliding rail slider 230, it is fastened to the aforementioned sliding rail moving part 220. The sliding rail moving part 220 can slide relative to the aforementioned sliding rail fastener 210. Therefore, the sliding rail fastener 210 and the aforementioned sliding rail moving part 220 in the present invention can be used alternatively and just need to be changed in shape according to the specific requirements of the cell phone structure.

In the sliding rail structure of the slide cell phone in present invention, the aforementioned sliding rail fastener 210 and the aforementioned sliding rail slider 230 are fastened and, near the two ends of the sliding rail fastener 210, two holes 212 with an identical U shape are placed. The sliding rail slider 230 is partially exposed; the material of the periphery of the aforementioned holes is folded, and peripheries of the body holes of the original sliding rail fastener 210 overlap; thus, even if the one protruding platform on the sliding rail slider 230 changes into three protruding platforms 130 and the three protruding platforms are used to fit and hold the aforementioned sliding rail fastener 220 on top. This can improve the stress capabilities of the entire sliding rail slider 230, thus effectively preventing the possibility of cracking on the plastic heads on the two ends of the slider 230 and the issue of unsmooth sliding.

On the aforementioned sliding rail fastener 210, at locations that connect to the cell phone main body 100, a plurality of first threaded holes 211 are also placed. Also, the first threaded holes 211 are placed in a way so that their peripheries protrude. The holes are also drilled in a way so that the metal on the peripheries of the holes protrude slightly. Thus, after they protrude, inside the first threaded holes 211 (at this time, there is no screw thread yet. So more accurately, these are the first holes parts), the thickness of the holes increases and then screw threads are tapped on their interior walls. The effective length of their screw threads can be thicker than the single sheet of the existing technology, thus making it possible to easily and securely fit the appropriate nuts and quite securely fasten the aforementioned cell phone main body and the aforementioned sliding rail fastener 210.

Thus, by increasing the effective length of the first threaded holes, the issue of screw detachment has been effectively controlled and the function of positioning and fastening the screw is achieved. That is the issue of the loosening and detachment of the sliding rail 200 and cell phone main body 100 is resolved, thus eliminating the fear of damage through a fall from a certain height.

In the sliding rail structure of the slide cell phone in present invention, as shown in FIG. 3, on the aforementioned sliding rail moving part 220, a plurality of second threaded holes 221 are also placed at locations that connect to the cell phone slide 300. The second threaded holes 221 are also placed in a way so that they protrude. That is, they protrude at the locations of the parts for the second holes (at this time, there is no screw thread yet). The holes are tapped and the metallic material on the peripheries of the hole parts protrude slightly. Then the thickness of the parts of the second holes also increases. Screw threads are tapped on the interior walls. Thus, the effective length of second threaded holes 221 is increased, thus effectively controlling the issue of the detachment of screws and achieving the function of positioning and securing the slide, and preventing the issue of the loosening and detachment of the sliding rail 200 and the cell phone slide.

In the method to achieve the sliding rail structure of the slide cell phone in present invention, its sliding rail structure uses an embodiment described above, comprising a sliding rail fastener fastened to the cell phone main body, a sliding rail slider and a sliding rail moving part that fastens and connects to the cell phone slide. The aforementioned sliding rail slider is placed between the aforementioned sliding rail fastener and the aforementioned sliding rail moving part and is used to muffle noise and facilitate sliding. Its achievement method comprises the following steps:

A. On the aforementioned sliding rail fastener 210, at a location that fastens to the aforementioned sliding rail slider 210 near the two ends of the sliding rail fastener 210, two U shaped holes 212 are drilled, so as to partially expose the sliding rail slider 230;

B. The material of the periphery of the aforementioned holes is folded, and peripheries of the body holes of the original sliding rail fastener 210 overlap;

Thus, the one protruding platform on the sliding rail slider 230 changes into three protruding platforms 130, greatly improving the stress capabilities of the sliding rail 200, making it unlikely for the plastic head on the two ends of the sliding rail slider 230 to crack, so that the sliding rail moving part 220 slides up and down more smoothly along the direction of the sliding rail slider 230.

In the method to achieve the sliding rail structure of the slide cell phone in present invention, its sliding rail structure uses an embodiment described above, comprising a sliding rail fastener fastened to the cell phone main body, a sliding rail slider and a sliding rail moving part that fastens and connects to the cell phone slide. The aforementioned sliding rail slider is placed between the aforementioned sliding rail fastener and the aforementioned sliding rail moving part and is used to muffle noise and facilitate sliding. Its method of use also comprises the following steps:

A. On the aforementioned sliding rail fastener 210, at locations that connect to the aforementioned cell phone main body 100, drill a plurality of first holes, so that the metallic materials on the peripheries of the holes protrude slightly, thus increasing the effective length of the interior walls of the first holes;

B. Tap screw threads inside the aforementioned first holes and form the first threaded holes 211;

C. On the aforementioned sliding rail moving part 220, at locations that connect to the aforementioned cell phone slide 300, drill a plurality of second holes, so that the metallic materials on the peripheries of the holes protrude slightly, thus increasing the effective length of the interior walls of the first holes; and D. Tap screw threads inside the aforementioned second holes and form the second threaded holes 221.

The protruding placement of the aforementioned first threaded holes and second threaded holes increases the effective length of the threaded holes, effectively controlling the issue of the detachment of screws and achieving the function of positioning and securing the cell phone main body and slide. That is, it effectively prevents the issue of the easy loosening and detachment of the sliding rail 200, the cell phone slide 300 and the cell phone main body 100, making the connection and fastening among them more secure.

Figure 4:
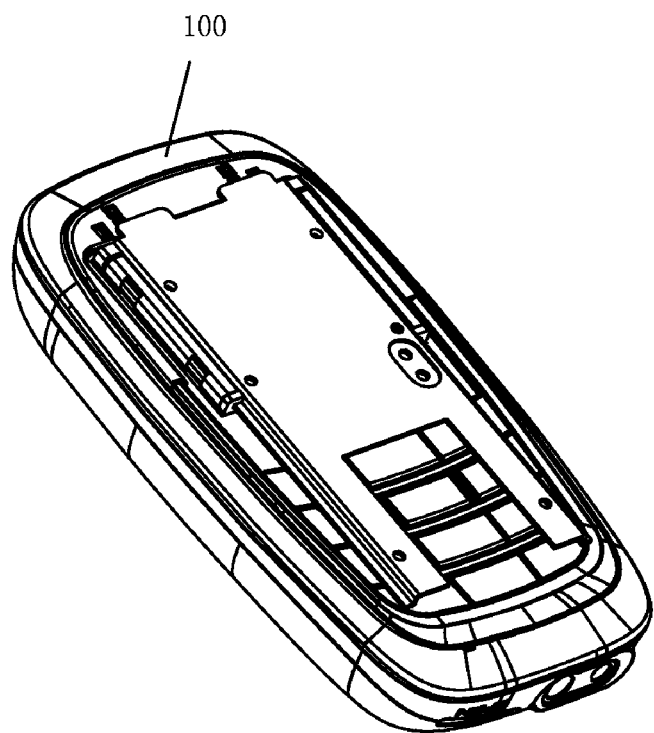
FIG. 4 is a diagram of the connecting and fastening device between the cell phone main body and the sliding rail fastener in the present invention.
Figure 5:
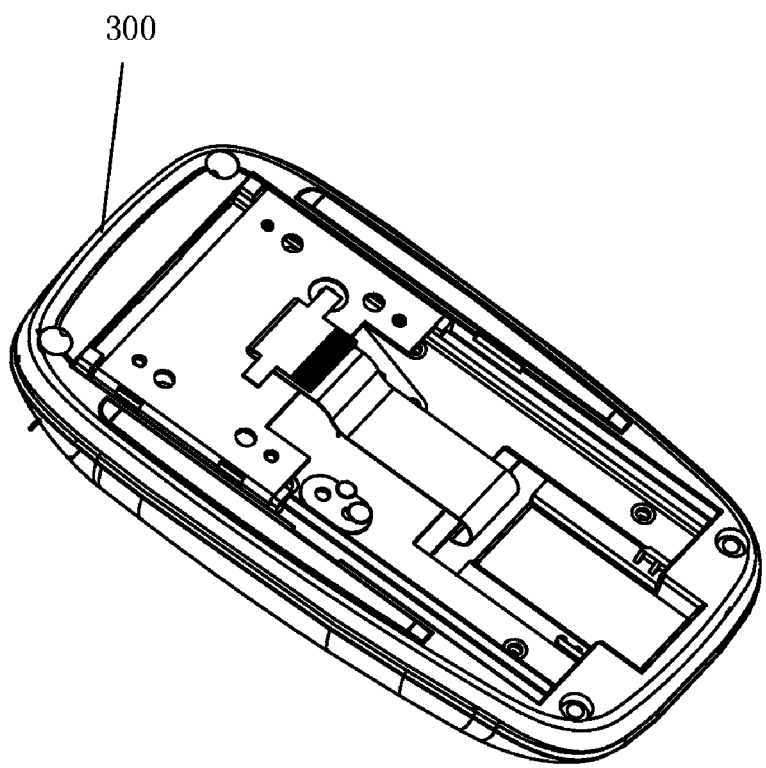
FIG. 5 is a diagram of the connecting and fastening device between the sliding cell phone slide and the sliding rail moving part in the present invention.
Figure 6:
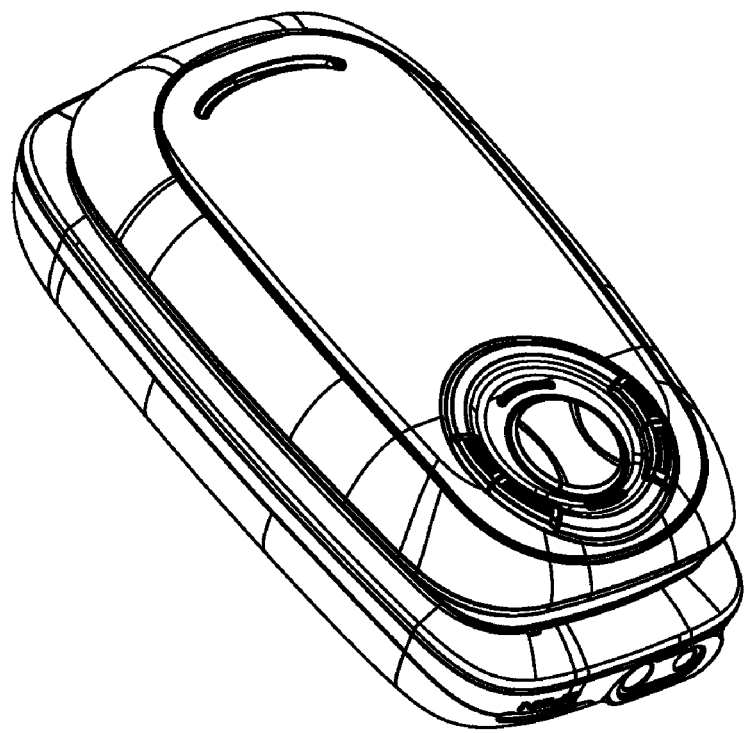
FIG. 6 is a diagram of the connecting and fastening device between the sliding cell phone main body and the sliding rail in the present invention.
Figure 7:
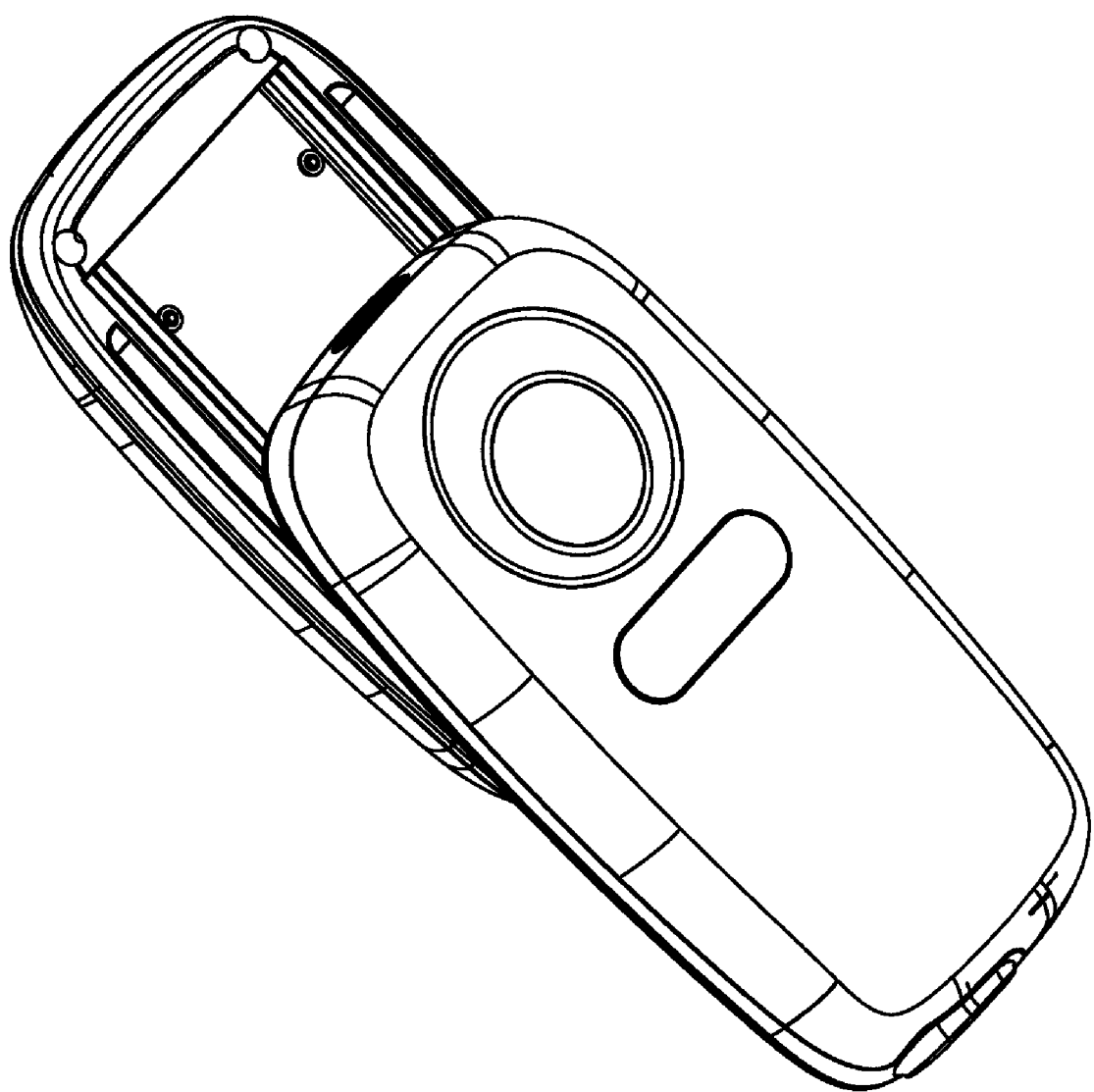
FIG. 7 is a schematic illustration of the state of the slide in the present invention that slides along with the sliding rail moving part.

The assembly steps of the slide cell phone in the present invention comprise: fastening the sliding rail fastener 210 to the cell phone main body 100 by a screw as shown in FIG. 4; fastening the sliding rail moving part 220 to the slide 300 by screw as shown in FIG. 5; fastening and connecting the cell phone main body 100 and the cell phone slide 300 by the sliding rail 200 and assembling a complete slide cell phone as shown in FIG. 6; the cell phone slide 300 slides up and down along the direction of sliding rail slider 230 with the sliding rail 200, as shown in FIG. 7.

A sliding rail structure of a sliding cell phone and its method of use provided by the present invention, wherein since three protruding platforms are placed on the slider between the sliding fastener and the sliding moving part instead of the one protruding platform originally, for use in fitting and holding the sliding rail fastener on its top, improves the stress capabilities of the slider, thus effectively controlling the possibility of cracking on the plastic heads on the two ends of the slider and thus causing unsmooth sliding; the flanged placement of the threaded holes at locations that connect the sliding rail fastener to the cell phone main body and locations that connect the sliding rail moving part and the cell phone slide increases the effective length of the original screw threads, thus properly preventing the detachment of screws, which cause the detachment of the sliding rail from the cell phone main body and the detachment of the sliding rail from the cell phone slide.

It should be understood that the above description of an embodiment is rather detailed and cannot be understood to be any limitation on the scope of patent protection for the present invention. The scope of patent protection for the present invention should be subject to the claims attached.

What is claimed is:

1. A sliding rail structure of a slide cell phone, comprising:
a sliding rail fastener fastened to the cell phone main body;
a sliding rail slider;
a sliding rail moving part that fastens and connects to a cell phone slide,
wherein the sliding rail slider being placed between the sliding rail fastener and the sliding rail moving part and being used to muffle noise and to facilitate sliding; and
a plurality of protruding platforms placed at locations that fasten the sliding rail slider and the sliding rail fastener, for use in fitting and holding the sliding rail fastener.

2. The sliding rail structure according to claim 1, wherein the number of the protruding platforms placed being three.

3. The sliding rail structure according to claim 2, wherein, on the sliding rail fastener, a plurality of first threaded holes being placed at locations for use in connecting to the cell phone main body, and wherein the first threaded holes being placed with protruding peripheries.

4. The sliding rail structure according to claim 3, wherein, on the aforementioned sliding rail moving part, a plurality of second threaded holes being placed at locations for use in connecting to the cell phone slide, and wherein the second threaded holes being placed with protruding peripheries.

5. A method to achieve a sliding rail structure of a slide cell phone, comprising:
drilling two holes on a sliding rail fastener at a location that fastens to a sliding rail slider, so as to partially expose the sliding rail slider; and
flanging the periphery of the holes, so that three protruding platforms are formed on the sliding rail slider.

6. The method according to claim 5, further comprising:
drilling a plurality of first holes on the sliding rail fastener, at locations that connect to the cell phone main body, so as to cause their peripheries to protrude; and
tapping a thread inside the first holes to form the first threaded holes.

7. The method according to claim 5, further comprising:
drilling a plurality of second holes on the sliding rail moving part, at locations that connect to the cell phone slide, so as to cause their peripheries to protrude; and
tapping a thread inside the second holes to form the second threaded holes.

8. The method according to claim 5, wherein the holes are placed near the two ends of the sliding rail fastener.

9. The method according to claim 5, wherein the holes are U shaped holes.

* * * * *